US012760186B2

(12) United States Patent
Yamamoto et al.

(10) Patent No.: US 12,760,186 B2
(45) Date of Patent: Oct. 13, 2026

(54) LIQUID DISPERSION OF FLUORIDE PARTICLES, COMPOSITION FOR FORMING OPTICAL FILM, AND OPTICAL FILM

(71) Applicant: STELLA CHEMIFA CORPORATION, Osaka (JP)

(72) Inventors: Hiroya Yamamoto, Osaka (JP); Rui Hasebe, Osaka (JP); Megumi Tomisaki, Osaka (JP); Masanori Uraya, Osaka (JP); Tetsuo Nishida, Osaka (JP); Keiichi Nii, Osaka (JP); Keigo Fujiwara, Osaka (JP)

(73) Assignee: STELLA CHEMIFA CORPORATION (JP)

(*) Notice: Subject to any disclaimer, the term of this patent is extended or adjusted under 35 U.S.C. 154(b) by 383 days.

(21) Appl. No.: 18/560,366

(22) PCT Filed: Mar. 28, 2022

(86) PCT No.: PCT/JP2022/015177
§ 371 (c)(1),
(2) Date: Nov. 10, 2023

(87) PCT Pub. No.: WO2022/249730
PCT Pub. Date: Dec. 1, 2022

(65) Prior Publication Data

US 2024/0279494 A1 Aug. 22, 2024

(30) Foreign Application Priority Data

May 26, 2021 (JP) ................................ 2021-088137

(51) Int. Cl.
*C09D 5/02* (2006.01)
*C09D 5/00* (2006.01)
(Continued)

(52) U.S. Cl.
CPC ............ *C09D 5/027* (2013.01); *C09D 5/006* (2013.01); *G02B 1/11* (2013.01); *C09D 7/20* (2018.01);
(Continued)

(58) Field of Classification Search
None
See application file for complete search history.

(56) References Cited

U.S. PATENT DOCUMENTS

| | | | | |
|---|---|---|---|---|
| 10,253,156 | B2 * | 4/2019 | Takeshita ................ | G02B 1/04 |
| 2009/0285993 | A1 | 11/2009 | Kang et al. | |

(Continued)

FOREIGN PATENT DOCUMENTS

| | | | |
|---|---|---|---|
| JP | 2006-154837 | A | 6/2006 |
| JP | 2006-249351 | A | 9/2006 |

(Continued)

OTHER PUBLICATIONS

International Search Report mailed May 24, 2022 in corresponding PCT International Application No. PCT/JP2022/015177.

(Continued)

*Primary Examiner* — Dung T Nguyen
(74) *Attorney, Agent, or Firm* — OSTROLENK FABER LLP

(57) ABSTRACT

Provided are a liquid dispersion of fluoride particles having a refractive index lower than that of, for example, magnesium fluoride, the liquid dispersion being excellent in dispersibility and suitable for production of an optical film such as an antireflection film; a composition for forming an optical film; and an optical film. A liquid dispersion of fluoride particles according to the present invention contains: fluoride particles; an anionic surfactant as a dispersant for the fluoride particles; and an organic solvent, wherein the fluoride particles contain at least aluminum, an alkali metal, (Continued)

and an alkaline earth metal as an optional element in a composition of the fluoride particles, and the fluoride particles are dispersed in the organic solvent.

14 Claims, 1 Drawing Sheet

(51) Int. Cl.

| | |
|---|---|
| ***G02B 1/11*** | (2015.01) |
| *C09D 7/20* | (2018.01) |
| *C09D 7/40* | (2018.01) |
| *C09D 7/45* | (2018.01) |
| *C09D 7/61* | (2018.01) |

(52) U.S. Cl.

CPC ................. *C09D 7/45* (2018.01); *C09D 7/61* (2018.01); *C09D 7/67* (2018.01)

(56) References Cited

U.S. PATENT DOCUMENTS

| | | | |
|---|---|---|---|
| 2010/0076109 | A1 | 3/2010 | Kang et al. |
| 2010/0265580 | A1 | 10/2010 | Yum et al. |
| 2015/0225569 | A1 | 8/2015 | Kameno et al. |
| 2021/0355254 | A1 | 11/2021 | Kato et al. |

FOREIGN PATENT DOCUMENTS

| | | | |
|---|---|---|---|
| JP | 4046921 | B2 | 2/2008 |
| JP | 2009-542891 | A | 12/2009 |
| JP | 2009-543156 | A | 12/2009 |
| JP | 2010-107583 | A | 5/2010 |
| JP | 2010-195901 | A | 9/2010 |
| JP | 2010-202857 | A | 9/2010 |
| JP | 2011-503658 | A | 1/2011 |
| JP | 2011-051851 | A | 3/2011 |
| JP | 4655614 | B2 | 3/2011 |
| JP | 5943754 | B2 | 6/2016 |
| JP | 6030893 | B2 | 11/2016 |
| JP | 2019-215451 | A | 12/2019 |
| WO | WO 2020/071504 | A1 | 4/2020 |

OTHER PUBLICATIONS

Decision of Refusal dated Aug. 18, 2025 issued in corresponding Japanese Patent Application No. 2022-51777, with its English translation.

Office Action issued in Japanese Patent Application No. 2022-051777, dated Mar. 10, 2025 with English translation.

Office Action dated May 11, 2026 issued in the corresponding Korean Patent Application No. 10-2023-7044045, with its English translation.

* cited by examiner

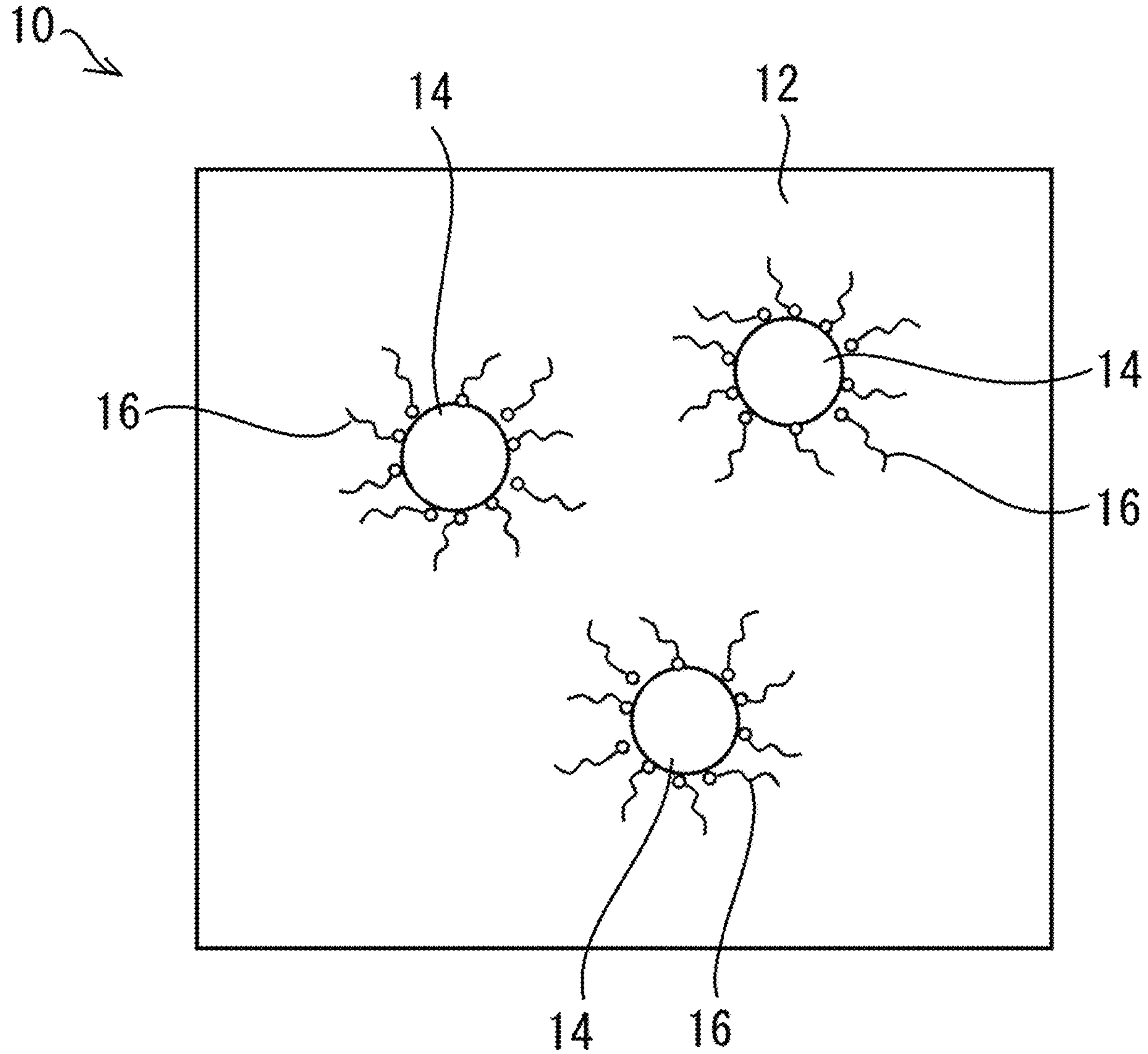
10
14
12
16
14
16
14
16

LIQUID DISPERSION OF FLUORIDE PARTICLES, COMPOSITION FOR FORMING OPTICAL FILM, AND OPTICAL FILM

CROSS-REFERENCE TO RELATED APPLICATIONS

The present application is a 35 U.S.C. §§ 371 national stage application of International Application No. PCT/JP2022/015177, filed Mar. 28, 2022, which claims priority to Japanese Patent Application No. 2021-088137, filed May 26, 2021, the contents of which are incorporated herein by reference.

TECHNICAL FIELD

The present invention relates to a liquid dispersion of fluoride particles, a composition for forming optical film and an optical film, and more particularly to a liquid dispersion of fluoride particles, which is suitable for an antireflection film of displays, lenses and the like, a composition for forming optical film and an optical film.

BACKGROUND ART

In the present day, people have many opportunities to come into contact with various displays of televisions, personal computers, smartphones, tablet computers, and car navigation systems. However, when the display is illuminated with light, irrespective of it being indoors or outdoors, light reflection reduces visibility and may cause eye fatigue and headaches. Therefore, the surfaces of these displays are coated to prevent light reflection. Furthermore, in recent years, the coating may be performed in order to add a value of a luxurious feeling to a decorative panel or the like in automobiles.

The coating for preventing light reflection is composed of a high refractive index layer and a low refractive index layer. The coating for preventing light reflection prevents light reflection on a display surface by utilizing the phase difference of light reflected on the surface of both the high refractive index layer and the low refractive index layer, leading to an improvement in visibility.

The methods for forming the low refractive index layer are roughly classified into vapor phase methods and coating methods. Of these, from a mass-production and equipment cost perspective, coating methods have good raw material utilization efficiency and are superior to vapor phase methods. Therefore, at present, a high productivity coating method is used for forming the low refractive index layer.

Patent Document 1 mentions that a magnesium fluoride sol or magnesium fluoride fine powder, which is chemically stable and has a low refractive index, is effective as a filler of a coating agent for forming a low refractive index layer. However, the refractive index of magnesium fluoride is about 1.38, and the refractive index of the low refractive index layer cannot be reduced below that point.

Patent Document 2 mentions a liquid dispersion of hollow spherical silica-based fine particles. Patent Document 3 also mentions a liquid dispersion in which hollow particles (core-shell particles) having a hollow core are dispersed inside a shell made of magnesium fluoride. These patent documents mention that silica-based fine particles and hollow particles are used as a filler of a coating agent to form an antireflection film having the lower refractive index. However, the silica-based fine particles of Patent Document 2 and the hollow particles of Patent Document 3 themselves have voids. Therefore, the antireflection film using these particles as the filler presents a problem of deteriorating mechanical strength and scratch resistance.

Patent Document 4 describes that hollow particles having a refractive index lower than that of magnesium fluoride and containing a fluoroaluminate compound are suitable for an inorganic filler used for a low refractive index layer of an antireflection film. However, as in the cases of Patent Documents 2 and 3, the hollow particles of Patent Document 4 themselves have voids, and thus have a problem that mechanical strength and scratch resistance are deteriorated. In addition, in Examples of Patent Document 4, an antireflection film containing hollow particles containing a fluoroaluminate compound is described, but there is no description regarding the optical performance thereof, and thus it is not clear.

Patent Document 5 describes that a low reflection film is formed using ultrafine particles of trisodium hexafluoroaluminate (another name: cryolite (refractive index: 1.33)) having a refractive index lower than that of magnesium fluoride. Here, in a normal low reflection film, fine particles having a low refractive index are uniformly dispersed in a resin serving as a binder, thereby preventing the fine particles from aggregating to increase the haze (cloudiness), and suppressing a decrease in visibility when the film is applied to a display or the like. However, in the low reflection film disclosed in Patent Document 5, a resin serving as a binder is not used. Furthermore, Patent Document 5 does not describe the haze that is one of important optical characteristics of the low reflection film.

PRIOR ART DOCUMENTS

Patent Documents

Patent Document 1: JP 4655614 B2
Patent Document 2: JP 4046921 B2
Patent Document 3: JP 5943754 B2
Patent Document 4: JP 6030893 B2
Patent Document 5: JP 2010-107583 A

SUMMARY OF THE INVENTION

Problems to be Solved by the Invention

The present invention has been made in view of the above problems, and an object of the present invention is to provide a liquid dispersion of fluoride particles having a refractive index lower than that of, for example, magnesium fluoride, the liquid dispersion being excellent in dispersibility and suitable for production of an optical film such as an antireflection film; a composition for forming an optical film; and an optical film using the composition.

Solutions to the Problems

In order to solve the above problems, the liquid dispersion of fluoride particles of the present invention comprises fluoride particles, an anionic surfactant as a dispersant for the fluoride particles and an organic solvent, wherein the fluoride particles contain at least aluminum, an alkali metal, and an alkaline earth metal as an optional element in a composition of the fluoride particles, and the fluoride particles are dispersed in the organic solvent.

In the constitution described above, it is preferred that a counter ion of a hydrophilic group in the anionic surfactant is a proton or an onium ion.

In the constitution described above, it is preferable that the anionic surfactant is at least one of an anionic hydrocarbon surfactant and an anionic fluorocarbon surfactant represented by a following Chemical Formula (1):

$$R—X—M \quad (1)$$

wherein R represents an alkyl group having 2 to 18 carbon atoms, an aryl group having 2 to 18 carbon atoms, a polyoxyalkylene alkyl ether group having 2 to 18 carbon atoms, an alkyl group having 2 to 18 carbon atoms in which at least one hydrogen atom is substituted with a fluorine atom, an aryl group having 2 to 18 carbon atoms in which at least one hydrogen atom is substituted with a fluorine atom, or a polyoxyalkylene alkyl ether group having 2 to 18 carbon atoms in which at least one hydrogen atom is substituted with a fluorine atom, X represents $—COO^-$, $—PO_4^-$, $—SO_3^-$, or $—SO_4^-$, and M represents a proton or an onium ion.

In the constitution described above, it is preferable that a content of the anionic surfactant is in a range of 0.2 mass % to 8 mass % with respect to 100 mass % of the fluoride particles.

In the constitution described above, it is preferable that the fluoride particles are particles of at least one fluoride selected from a group consisting of $Na_3AlF_6$, $Na_3Al_3F_{14}$, $Na_3Li_3Al_2F_{12}$, $Na_2MgAlF_7$, $K_2NaAlF_6$, $LiCaAlF_6$, and $LiSrAlF_6$.

In the constitution described above, it is preferable that a moisture concentration in the liquid dispersion of fluoride particles is 1.5 mass % or less with respect to 100 mass % of the liquid dispersion of fluoride particles.

In the constitution described above, it is preferable that the organic solvent is at least one of an alcohol solvent, a ketone solvent, and an ether solvent.

In the constitution described above, it is preferable that an average dispersed particle size of the fluoride particles is in a range of 1 nm to 100 nm.

In the constitution described above, it is preferable that a content of the fluoride particles is in a range of 1 mass % to 30 mass % with respect to 100 mass % of the liquid dispersion of fluoride particles.

In the constitution described above, it is preferable that an Rsp value of the liquid dispersion of fluoride particles as measured by pulse NMR is 5 or more.

In order to solve the above problems, a composition for forming an optical film of the present invention comprises the liquid dispersion of fluoride particles.

In order to solve the above problems, an optical film of the present invention comprises a cured film of the composition for forming an optical film.

BRIEF DESCRIPTION OF THE FIGURE

FIGURE depicts a liquid dispersion according to the present invention.

EFFECTS OF THE INVENTION

According to the present invention, by using an anionic surfactant as a dispersant for fluoride particles containing at least aluminum and an alkali metal in the composition of the particles, it is possible to provide a liquid dispersion of fluoride particles which has excellent dispersibility, and a composition for forming an optical film which contains the liquid dispersion. In addition, the fluoride particles have a refractive index lower than that of, for example, magnesium fluoride. Therefore, the liquid dispersion of fluoride particles and the composition for forming an optical film which contains the liquid dispersion according to the present invention are suitable for production of an optical film such as an antireflection film. Furthermore, by using the liquid dispersion of fluoride or the composition for forming an optical film which contains the liquid dispersion, it is possible to provide an optical film such as an antireflection film, which has uniform and favorable optical characteristics such as haze and light reflectance in the plane of the film.

EMBODIMENT OF THE INVENTION (Liquid Dispersion of Fluoride Particles)

The dispersion of fluoride particles according to the present embodiment (hereinafter sometimes referred to as "liquid dispersion") will be described below.

Referring to the FIGURE. the liquid dispersion 10 of the present embodiment contains at least fluoride particles 14, an anionic surfactant 16 as a dispersant, and an organic solvent 12. The fluoride particles 14 exist in a state of being dispersed in the organic solvent 12.

Here, the term "liquid dispersion" as used herein refers to a dispersion in which a dispersoid is dispersed in a liquid dispersion medium. Therefore, the term "liquid dispersion" does not include a dispersion such as a solid colloid (organogel) in which a dispersoid is dispersed in a solid dispersion medium and the fluidity thereof is lost.

The fluoride in the fluoride particles contains at least aluminum and an alkali metal in the composition thereof. The fluoride may contain an alkaline earth metal as an optional element in the composition thereof.

The alkali metal is not particularly limited, and examples thereof include lithium, sodium, and potassium. The alkaline earth metal is not particularly limited, and examples thereof include magnesium, calcium, and strontium.

Specific examples of the fluoride include $Na_3AlF_6$ (refractive index: 1.33), $Na_5Al_3F_{14}$ (refractive index: 1.33), $Na_3Li_3Al_2F_{12}$ (refractive index: 1.34), $Na_2MgAlF_7$ (refractive index: 1.35), $K_2NaAlF_6$ (refractive index: 1.38), $LiCaAlF_6$ (refractive index: 1.38), and $LiSrAlF_6$ (refractive index: 1.38). The particles containing these fluorides can be used singly or in combination of two or more thereof. Among the exemplified fluoride particles, $Na_3AlF_6$ having a refractive index of less than 1.34 and a low solubility in water is particularly preferable.

The content of fluoride particles is preferably in the range of 1% by mass to 30% by mass, more preferably 2% by mass to 15% by mass, and still more preferably 5% by mass to 10% by mass, relative to 100% by mass of the liquid dispersion of fluoride particles. By setting the content of the fluoride particles at 1% by mass or more, it is possible to suppress the use of a large amount of the liquid dispersion, for example, when mixing with a binder component (details will be described later) which is a constituent material of the optical film. As a result, even when the aprotic organic solvent is removed in the film formation process of the optical film, the time required for removal can be reduced. Meanwhile, by setting the content of the fluoride particles at 30% by mass or less, it is possible to suppress extension of the dispersion time of fluoride particles and to reduce the probability that the fluoride particles aggregate with each other.

The average dispersion particle size (d50) of fluoride particles is preferably in the range of 1 nm to 100 nm, more preferably 10 nm to 50 nm. By setting the average dispersion particle size at 1 nm or more, it is possible to suppress distinct aggregation of the fluoride particles due to intermolecular force. Meanwhile, by setting the average dispersion particle size at 100 nm or less, for example, when fluoride particles are used as a filler for an optical film such as an antireflection film, it is possible to reduce desorption of the fluoride particles from the optical film and deterioration of the light transparency. The method and apparatus for measuring the average dispersed particle size of the fluoride particles are not particularly limited, and are, for example, as described in Examples described later.

The anionic surfactant functions as a dispersant that imparts good dispersibility to fluoride particles. In the present embodiment, examples of the anionic surfactant include an anionic hydrocarbon surfactant and an anionic fluorocarbon surfactant. Among these anionic surfactants, the anionic fluorocarbon surfactant has a refractive index lower than that of the anionic hydrocarbon surfactant, and thus is suitable as a constituent material of an optical film when a liquid dispersion containing the anionic fluorocarbon surfactant is used. The anionic hydrocarbon surfactant and the anionic fluorocarbon surfactant may be used in combination.

Here, the term “anionic hydrocarbon surfactant” as used herein means a surfactant containing one or two or more hydrocarbon moieties and one or two or more anionic groups (hydrophilic moieties) in the molecule. In addition, the term “anionic fluorocarbon surfactant” means a surfactant containing one or two or more hydrocarbon moieties in which at least one hydrogen atom is substituted with a fluorine atom, and one or two or more anionic groups in the molecule.

The anionic surfactant of the present embodiment can be represented by the following Chemical Formula (1).

$$R—X—M \qquad (1)$$

R in Chemical Formula (1) is a hydrocarbon moiety, and is an alkyl group having 2 to 18 carbon atoms, preferably 5 to 15 carbon atoms, and more preferably 10 to 14 carbon atoms: an aryl group having 2 to 18 carbon atoms, preferably 5 to 15 carbon atoms, and more preferably 10 to 14 carbon atoms: a polyoxyalkylene alkyl ether group having 2 to 18 carbon atoms, preferably 5 to 15 carbon atoms, more preferably 10 to 14 carbon atoms: an alkyl group having 2 to 18 carbon atoms, preferably 2 to 10 carbon atoms, more preferably 4 to 6 carbon atoms, in which at least one hydrogen atom is substituted with a fluorine atom: an aryl group having 2 to 18 carbon atoms, preferably 5 to 15 carbon atoms, more preferably 8 to 12 carbon atoms, in which at least one hydrogen atom is substituted with a fluorine atom; or a polyoxyalkylene alkyl ether group having 2 to 18 carbon atoms, preferably 5 to 15 carbon atoms, more preferably 8 to 12 carbon atoms, in which at least one hydrogen atom is substituted with a fluorine atom. R may be either linear or branched. In the present specification, when the range of the number of carbon atoms is represented, it means that the range includes the number of carbon atoms of all integers included in the range. Therefore, for example, an alkyl group having “1 to 3 carbon atoms” means all alkyl groups having 1, 2, and 3 carbon atoms.

X and M in Chemical Formula (1) each represent an anionic group (hydrophilic group). Among them, X represents $—COO^-$, $—PO_4^-$, $—SO_3^-$, or $—SO_4^-$. M represents a counter ion of the hydrophilic group, and in the present embodiment, a proton ($H^+$) or an onium ion is preferable. These counter ions can improve the solubility and dispersibility of the fluoride particles in the organic solvent.

Furthermore, the onium ion is preferably represented by the following Chemical Formula (2).

$$H^+ \cdot [NR^1R^2R^3] \qquad (2)$$

wherein $R^1$, $R^2$, and $R^3$ in Chemical Formula (2) are each independently hydrogen, an alkyl group having 1 to 8 carbon atoms, preferably 1 to 5 carbon atoms, and more preferably 1 to 3 carbon atoms; an aryl group having 1 to 8 carbon atoms, preferably 1 to 5 carbon atoms, and more preferably 1 to 3 carbon atoms; and a hydroxyalkyl group having 1 to 8 carbon atoms, preferably 1 to 5 carbon atoms, more preferably 1 to 3 carbon atoms. The alkyl group, the aryl group, and the hydroxyalkyl group in $R^1$, $R^2$, and $R^3$ may be either linear or branched.

More specific examples of the onium ion include an ammonium ion, a methylammonium ion, a trimethylammonium ion, an ethylammonium ion, a dimethylammonium ion, and a triethanolammonium ion. Among these onium ions, ammonium ions are particularly preferable from the viewpoint of the solubility of the fluoride particles in the organic solvent.

Specific examples of the anionic hydrocarbon surfactant include heptanoic acid, octanoic acid, nonanoic acid, decanoic acid, and ammonium salts thereof: heptanesulfonic acid, octanesulfonic acid, decanesulfonic acid, laurylsulfonic acid, and ammonium salts thereof: laurylbenzenesulfonic acid and ammonium salts thereof: heptyl sulfuric acid, octyl sulfuric acid, decyl sulfuric acid, lauryl sulfuric acid, and ammonium salts thereof: octyl phosphoric acid, decyl phosphoric acid, lauryl phosphoric acid, and ammonium salts thereof: polyoxyethylene lauryl ether sulfuric acid and ammonium salt thereof: polyoxyethylene lauryl ether sulfonic acid and ammonium salt thereof: polyoxyethylene tridecylether phosphoric acid ester, polyoxyethylene lauryl ether phosphoric acid, and ammonium salts thereof. The exemplified anionic hydrocarbon surfactants can be used singly or in combination of two or more thereof. Among the exemplified anionic hydrocarbon surfactants, laurylbenzenesulfonic acid is preferable from the viewpoint of the dispersibility of the fluoride particles in the organic solvent. Furthermore, the exemplified anionic hydrocarbon surfactants can be used in any combination with any of the exemplified fluoride particles in addition to the $Na_3AlF_6$ particles described above.

Furthermore, commercially available surfactants can be used as the anionic hydrocarbon surfactant. Examples of the commercially available surfactant include NEOPELEX (registered trademark) G-15, NEOPELEX G-25, NEOPELEX G-65, and NEOPELEX GS (all are trade names, manufactured by Kao Corporation.): Solsperse (registered trademark) 3000, Solsperse 21000, Solsperse 26000, Solsperse 36600, and Solsperse 41000 (all are trade names, manufactured by The Lubrizol Corporation); DISPERBYK (registered trademark)-108, DISPERBYK-110, DISPERBYK-111, DISPERBYK-112, DISPERBYK-116, DISPERBYK-142, DISPERBYK-145, DISPERBYK-180, DISPERBYK-2000, and DISPERBYK-2001 (all are trade names, manufactured by BYK Chemie GmbH); PLYSURF (registered trademark) A208N, PLYSURF A208F, PLYSURF A208B, PLYSURF A219B, PLYSURF AL, PLY- SURF A212C, and PLYSURF A215C (all are trade names, manufactured by DKS Co. Ltd.); DISPARLON (registered trademark) 3600N and DISPARLON 1850 (all are trade names, manufactured by Kusumoto Chemicals, Ltd.); PA111 (trade name: Ajinomoto Fine-Techno Co., Inc.); and EFKA 4401 and EFKA 4550 (all are trade names, manufactured by EFKA Additives). The exemplified commercially available surfactants can be used singly or in combination of two or more thereof. The commercially available surfactant is not limited to those exemplified.

Specific examples of the anionic fluorocarbon surfactant include 3H-tetrafluoropropionic acid, 5H-octafluoropentanoic acid, 7H-dodecafluoroheptanoic acid, and 9H-hexadecafluorononanoic acid. The exemplified anionic fluorocarbon surfactants can be used singly or in combination of two or more thereof. Among these anionic fluorocarbon surfactants, 7H-dodecafluoroheptanoic acid is preferable from the viewpoint of the dispersibility of the fluoride particles in the organic solvent. Furthermore, the exemplified anionic fluorocarbon surfactants can be used in any combination with any of the exemplified fluoride particles in addition to the $Na_3AlF_6$ particles described above.

The content of the anionic surfactant is preferably in a range of 0.2 mass % to 8 mass %, and more preferably in a range of 1 mass % to 4 mass % with respect to 100 mass % of the fluoride particles. When the content of the anionic surfactant is 0.2 mass % or more, the dispersibility of the fluoride particles can be improved. When the content of the anionic surfactant is 8 mass % or less, compatibility between fluoride particles and an acrylate resin or the like as a binder component (details will be described later) is improved during formation of the optical film, so that deterioration of light transparency can be reduced.

The organic solvent is not particularly limited, but is preferably an alcohol solvent, a ketone solvent, or an ether solvent. These organic solvents can be used singly or in combination of two or more thereof.

The alcohol solvent is not particularly limited, and examples thereof include methanol, ethanol, 1-propanol, 2-propanol, 1-butanol, 1-pentanol, cyclohexanol, methylcyclohexanol, 1-methoxy-2-propanol, 2-methoxy-1-propanol, and 3-methyl-1-butanol. These alcohol solvents can be used singly or in combination of two or more thereof.

The ketone solvent is not particularly limited, and examples thereof include methyl isobutyl ketone, methyl ethyl ketone, methyl butyl ketone, cyclohexanone, methyl cyclohexanone, and acetylacetone. These ketone solvents can be used singly or in combination of two or more thereof.

Examples of the ether solvent include ethylene glycol dimethyl ether, propylene glycol monomethyl ether, propylene glycol monomethyl ether acetate, and tetrahydrofuran. These ether solvents can be used singly or in combination of two or more thereof.

The exemplified organic solvents can be used in any combination with any of the exemplified fluoride particles and the exemplified anionic hydrocarbon surfactants in addition to the $Na_3AlF_6$ particles described above. Among the exemplified organic solvents, 1-methyl-2-propanol, methyl ethyl ketone, methyl isobutyl ketone, and propylene glycol monomethyl ether are preferable in the present embodiment. For example, when the liquid dispersion of fluoride particles of the present embodiment is applied to the composition for forming an optical film, these organic solvents have an excellent solubility in the acrylate-based solvent as a binder component contained in the composition for forming an optical film. In addition, these organic solvents have high volatility, and thus are suitable for production of optical films such as an antireflection film.

In the present embodiment, the moisture concentration in the liquid dispersion of fluoride particles is preferably 1.5 mass % or less, more preferably 1.0 mass % or less, and still more preferably 0.8 mass % or less with respect to 100 mass % of the liquid dispersion of fluoride particles. When the moisture concentration in the liquid dispersion of fluoride particles is 1.5 mass % or less, the fluoride particles do not aggregate in the liquid dispersion, and the liquid dispersion can be stabilized.

In the liquid dispersion of fluoride particles, the Rsp value measured by pulse NMR is preferably 5 or more, and more preferably in a range of 10 to 25. When the Rsp value is 5 or more, the solvent affinity of the liquid dispersion of fluoride particles is high, the aggregation of the fluoride particles is suppressed, thus making it possible to favorably maintain the dispersion stability of the fluoride particles. The Rsp value can be adjusted by controlling the content of the anionic surfactant and/or the moisture concentration in the liquid dispersion. The Rsp value can be increased by, for example, increasing the content of the anionic surfactant within a range not exceeding the above-described numerical range. The Rsp value can also be increased by reducing the amount of moisture in the liquid dispersion. The method for measuring the Rsp value will be described later in Examples.

The viscosity of the liquid dispersion is preferably in the range of 200 mPa's or less from the viewpoint of improving the compatibility with the binder component contained in the composition for forming an optical film.

(Method for Producing Fluoride Particles)

Next, a method for producing fluoride particles according to the present embodiment will be described below using $Na_3AlF_6$ particles as an example. The production method described below is an example, and the present invention is not limited to this production method. The production method described below is also applicable to fluoride particles other than $Na_3AlF_6$ particles.

The method for producing $Na_3AlF_6$ particles includes the steps of: reacting a sodium salt aqueous solution and an aluminum salt aqueous solution with a fluoride precursor and obtaining a slurry of $Na_3AlF_6$ particles: performing solid-liquid separation and washing of the obtained slurry; and removing moisture from a paste of $Na_3AlF_6$ particles after washing and obtaining a dry solid of $Na_3AlF_6$ particles.

The sodium salt in the sodium salt aqueous solution is not particularly limited, and examples thereof include sodium sulfate, sodium acetate, sodium nitrate, and sodium hydroxide. These sodium salts can be used singly or in combination of two or more thereof.

The aluminum salt in the aluminum salt aqueous solution is not particularly limited, and examples thereof include aluminum sulfate, aluminum acetate, aluminum nitrate, and aluminum hydroxide. These aluminum salts can be used singly or in combination of two or more thereof.

The sodium salt aqueous solution and the aluminum salt aqueous solution are each obtained by dissolving a sodium salt or an aluminum salt in water. The dissolution temperature when the sodium salt or the aluminum salt is dissolved in water can be appropriately set according to the solubility of the sodium salt or the aluminum salt in water, and the like. For example, when a sodium salt and/or an aluminum salt that exhibits sufficient solubility in water even at room temperature is used, these salts may be dissolved at room temperature. When a sodium salt and/or an aluminum salt having low solubility in water at room temperature is used, these salts may be dissolved in water by heating to shorten the time required for dissolution.

The fluoride precursor is not particularly limited as long as it is a salt soluble in water. Examples of the fluoride precursor include sodium fluoride, potassium fluoride, ammonium fluoride, quaternary ammonium fluoride, ammonium hydrogen difluoride, and hydrogen fluoride. These fluoride precursors can be used singly or in combination of two or more thereof.

The reaction of the sodium salt aqueous solution and the aluminum salt aqueous solution with the fluoride precursor may be performed after filtration of the sodium salt aqueous solution and the aluminum salt aqueous solution for the purpose of removing foreign substances in the aqueous solution.

The reaction of the sodium salt aqueous solution and the aluminum salt aqueous solution with the fluoride precursor can be performed by adding a solid fluoride precursor to a mixed solution containing a sodium salt aqueous solution and an aluminum salt aqueous solution. Alternatively, the reaction can also be performed by adding a solid fluoride precursor to either one of a sodium salt aqueous solution and an aluminum salt aqueous solution, and then mixing and reacting, with the obtained mixture, a sodium salt aqueous solution or an aluminum salt aqueous solution to which the fluoride precursor is not added. Furthermore, the reaction may also be performed by mixing and reacting a sodium salt aqueous solution and an aluminum salt aqueous solution with a fluoride precursor aqueous solution in which a fluoride precursor is dissolved in water, in any order or simultaneously. In the case of a method of mixing and reacting a sodium salt aqueous solution and an aluminum salt aqueous solution with a fluoride precursor aqueous solution, it is possible to simplify the production process and facilitate the reaction. When the fluoride precursor aqueous solution is used, filtration may be performed in advance to remove foreign substances in the fluoride precursor aqueous solution.

The reaction temperature for the reaction of the sodium salt aqueous solution and the aluminum salt aqueous solution with the fluoride precursor is not particularly limited, but if the reaction temperature is too low, the progress of the reaction may be slow. On the other hand, when the reaction temperature is too high, vapor is generated from the sodium salt aqueous solution, the aluminum salt aqueous solution, and/or the fluoride precursor aqueous solution, and the concentration of the mixed solution (reaction solution) may change. From these viewpoints, the reaction temperature is preferably in a range of 20° C. to 50° C., more preferably 23° C. to 45° C., and particularly preferably 25° C. to 40° C.

The method for performing solid-liquid separation of the obtained slurry of $Na_3AlF_6$ particles is not particularly limited, and examples thereof include suction filtration and centrifugal dehydration. When the particle size of the $Na_3AlF_6$ particles is small and fine, solid-liquid separation may be difficult by suction filtration or centrifugal dehydration. In such a case, solid-liquid separation may be performed using a centrifuge, or the slurry itself may be evaporated to dryness.

The fluoride particle paste obtained by solid-liquid separation can be washed, for example, with water. This makes it possible to remove the unreacted fluoride precursor and other anions. The washing temperature and washing time are not particularly limited, and can be appropriately set as needed.

The method for removing moisture from the paste of $Na_3AlF_6$ particles after washing is, for example, a heat treatment. Thereby, a dry powder of $Na_3AlF_6$ particles can be obtained. The heat treatment method is not particularly limited, and is, for example, a method of placing a paste of $Na_3AlF_6$ particles in a tray made of FRP and drying the paste in a dryer.

The heating temperature (drying temperature) at the time of the heat treatment is preferably in a range of 100° C. to 300° C., and more preferably 100° C. to 200° C. By setting the heating temperature to 100° C. or higher, the moisture contained in the paste of $Na_3AlF_6$ particles can be sufficiently removed or reduced. On the other hand, by setting the heating temperature to 300° C. or lower, heat fusion between $Na_3AlF_6$ particles and grain growth of $Na_3AlF_6$ particles can be suppressed. The heating time (drying time) at the time of the heat treatment is not particularly limited, and can be appropriately set as necessary.

The heat treatment may be performed in the air or in an inert gas environment. The inert gas is not particularly limited, and examples thereof include nitrogen and argon. From the viewpoint of promoting drying of the paste of $Na_3AlF_6$ particles, heat treatment may be performed under a reduced pressure environment.

Fluoride particles other than $Na_3AlF_6$ particles can be produced by a known production method. In addition, raw materials to be used and production conditions can also be appropriately set as necessary.

(Method for Producing Liquid Dispersion of Fluoride Particles)

Next, a method for producing a liquid dispersion of fluoride particles according to the present embodiment will be described below.

The liquid dispersion of the present embodiment can be obtained by mixing fluoride particles such as $Na_3AlF_6$ particles obtained by the above-described production method, an anionic surfactant, and an organic solvent, and dispersing the fluoride particles in the organic solvent. The method for producing a liquid dispersion of fluoride particles according to the present embodiment may also include the above-described method for producing fluoride particles.

In the method for producing fluoride particles of the present embodiment, the method for mixing and the order of addition of the fluoride particles, the anionic surfactant, and the organic solvent are not particularly limited. The liquid dispersion of fluoride particles of the present embodiment may be produced by, for example, adding fluoride particles to an organic solvent, subjecting the mixed solution to dispersion treatment using a disperser, and then adding an anionic surfactant to the mixed solution. The liquid dispersion of fluoride particles of the present embodiment may also be produced by mixing fluoride particles, an anionic surfactant, and an organic solvent at a time and then subjecting the mixture to dispersion treatment using a disperser.

The method for dispersing the fluoride particles in the organic solvent is not particularly limited, and examples thereof include methods using a wet bead mill, a wet jet mill, and ultrasonic waves. The dispersion method may be selected in consideration of the quality such as the average dispersed particle size and purity of the intended fluoride particles and the apparatus used for pulverization.

For example, when it is desired to improve the dispersibility of fluoride particles, a method using a wet bead mill is preferable. In a wet bead mill, the particles are made finer by using a medium such as zirconia beads, thus making possible an improvement in the dispersion force of the fluoride particles. However, the resulting dispersion may be contaminated by media. When it is desired to improve the purity of the liquid dispersion, a method using a wet jet mill is preferable. The method using the wet jet mill is a wet pulverization method using no medium, and is capable of preventing contamination by a medium such as a wet bead mill. However, since no medium is used, the dispersion force of the fluoride particles may decrease. The dispersion time is not particularly limited, and can be appropriately set according to the type of the fluoride particles, anionic surfactant, organic solvent, and the like.

In the process of producing the liquid dispersion, it is preferable to control the moisture concentration in the liquid dispersion. Examples of the method for controlling the moisture concentration include a method of performing wet pulverization in a place where the dew point is controlled, such as a dry room, and a method of performing treatment in an environment of an inert gas in a sealed space so that the fluoride particles, the organic solvent, and the liquid dispersion containing these are not exposed to the outside air. The inert gas is not particularly limited, and examples thereof include dry air, nitrogen, and argon.

The moisture adsorbed on the surface of the fluoride particles may be removed in advance before the fluoride particles are added to and dispersed in the organic solvent. Furthermore, moisture may be removed from the organic solvent. As a method for removing the moisture adsorbed on the surface, for example, the moisture can be removed by heat treatment. The drying temperature in the heat treatment is preferably in a range of 100° C. to 200° C., and more preferably 110° C. to 150° C. The drying time is preferably in a range of 2 hours to 34 hours, and more preferably 5 hours to 20 hours. Examples of the method for removing moisture from the organic solvent include distillation, centrifugation, and use of a dehydrating material (molecular sieves, zeolites, ion exchange resins, activated alumina, and the like). Alternatively, a method of bubbling an inert gas such as nitrogen into an aprotic organic solvent may be used.

(Composition for Forming Optical Film and Method for Producing Composition)

Next, the composition for forming an optical film and the method for producing the composition according to the present embodiment will be described below.

The composition for forming an optical film of the present embodiment contains at least a liquid dispersion of fluoride particles and a binder component.

The content of the liquid dispersion is preferably 15 mass % or more and 45 mass % or less, more preferably 18 mass % or more and 40 mass % or less, and particularly preferably 20 mass % or more and 35 mass % or less with respect to the total mass of the composition for forming an optical film. The content of the binder component is preferably 0.8 mass % or more and 5 mass % or less, more preferably 1 mass % or more and 4 mass % or less, and particularly preferably 2 mass % or more and 3 mass % or less with respect to the total mass of the composition for forming an optical film.

Examples of the binder component include, but are not particularly limited to, a resin, a polymerizable monomer and the like.

The resin is not particularly limited, and known thermosetting resins, thermoplastic resins and the like can be used. More specifically, examples thereof include an acrylic resin, a polyester resin, a polycarbonate resin, a polyamide resin, a urethane resin, a vinyl chloride resin, a fluororesin, a silicone resin, an epoxy resin, a melamine resin, a phenol resin, a butyral resin, a vinyl acetate resin and the like. These resins can be used alone, or two or more thereof can be used as a mixture. It is also possible to use as a copolymer or a modified product composed of two or more resins. Of the exemplified resins, a resin containing a fluorine atom, such as a fluororesin is preferable because the refractive index of the optical film can be reduced.

The polymerizable monomer is not particularly limited, and a known monomer capable of being polymerized by radical polymerization, anionic polymerization, cationic polymerization or the like can be used. More specifically, examples thereof include nonionic monomers (styrene, methyl methacrylate, 2-hydroxyethyl acrylate and the like), anionic monomers (methacrylic acid, maleic acid, itaconic acid, 2-acrylamide-2-methylpropanesulfonic acid, o- and p-styrene sulfonates, and salts thereof), cationic monomers (N-(3-acrylamidepropyl)ammonium methacrylate, N-(2-methacryloyloxyethyl)-N, 1,2-dimethyl-5-vinylpyridinium methosulfate, and salts thereof), crosslinked monomers (divinylbenzene, ethylene diacrylate, N, N'-methylenebisacrylamide and the like) and the like. These polymerizable monomers can be used alone, or two or more thereof can be used as a mixture. Of the exemplified polymerizable monomers, a polymerizable monomer having a fluorine atom is preferable because the refractive index of the optical film can be reduced.

The composition for forming an optical film may contain other additives as long as the object and effect of the present invention are not impaired. Examples of other additives include photopolymerization initiators, photocurable compounds, polymerization inhibitors, photosensitizers, leveling agents, surfactants, antibacterial agents, antiblocking agents, plasticizers, ultraviolet absorbers, infrared absorbents, antioxidants, silane coupling agents, conductive polymers, conductive surfactants, inorganic fillers, pigments, dyes and the like. The amount of these additives added can be appropriately set as needed.

The photopolymerization initiator means an additive that generates radical species by irradiation with active energy rays such as ultraviolet rays, and examples thereof include 1-hydroxycyclohexyl phenyl ketone.

The method for producing a composition for forming an optical film is not particularly limited, and the composition for forming an optical film can be produced by mixing predetermined amounts of a liquid dispersion of fluoride particles and a binder component. When the composition contains an additive, the composition can be produced by, for example, further adding a predetermined amount of the additive to a mixture of a liquid dispersion of fluoride particles and a binder component.

(Method for Producing Optical Film)

Next, the optical film and the method for producing the same according to the present embodiment will be described below.

The optical film of the present embodiment comprises a dry cured film of the above-mentioned composition for forming an optical film. Fluoride particles as a filler are uniformly contained in this optical film, and the optical film has low refractive index as compared with, for example, an optical film using magnesium fluoride. The optical film has uniform and satisfactory optical properties in the plane, such as high light transmittance, reduced haze and reduced light reflectance.

The optical film of the present embodiment can be used as, for example, an antireflection film or the like.

The content of fluoride particles contained in the optical film is preferably in the range of 40% by volume to 90% by volume relative to 100% by volume of the optical film. It is practical when the content of the fluoride particles is in the above range, because the effect of reducing the refractive index of the optical film can be maintained while suppressing a decrease in physical and chemical strength of the optical film.

The thickness of the optical film is not particularly limited, and can be set as needed.

The optical film can be formed, for example, by the following method. That is, the composition for forming an optical film is coated on a substrate or the like, and then the coating film of the optical film forming composition is dried. Subsequently, the dried coating film is photocured by irradiating with ultraviolet rays having a predetermined light intensity. As a result, the optical film of the present embodiment is obtained.

Examples of the method for coating the composition for forming an optical film include, but are not particularly limited to, a dipping method, a spray method, a spinner (spin coating) method, a roll coating method, a reverse coating method, a gravure coating method, a rod coating method, a bar coating method, a die coat method, spray coating method and the like. When a low refractive index layer is formed, a reverse coating method, particularly a reverse coating method using a small diameter gravure roll is preferable from the viewpoint of coating accuracy.

Examples of the substrate include, but are not particularly limited to, a plastic sheet, a plastic film, a plastic panel and glass. Examples of the material constituting the plastic sheet, the plastic film and the plastic panel include, but are not particularly limited to, polycarbonate, acrylic resin, polyethylene terephthalate (PET) and triacetyl cellulose (TAC).

In addition, the composition for forming an optical film in a state of being further added to a solvent may be applied onto a substrate. The solvent is formulated for the purpose of improving the workability of the coating (including printing). The solvent is not particularly limited as long as it dissolves the composition for forming an optical film or the composition for forming an optical film exhibits compatibility with the solvent, and for example, propylene glycol monomethyl ether or the like can be used.

The amount of the solvent used is not particularly limited as long as it is in the range suitable for forming an optical film, but is usually in the range of 10% by mass to 95% by mass relative to 100% by mass of the composition for forming an optical film.

The method for drying the coating film of the composition for forming an optical film (in addition, a case of adding the above-described solvent is also included) which has been applied to the substrate is not particularly limited, and the drying can be performed by natural drying, blowing hot air, or the like. The drying time and the drying temperature are not particularly limited, and can be appropriately set according to the thickness of the coating film, the constituent material, and the like.

There is no particular limitation on the method of irradiating the dried coating film with ultraviolet rays and the irradiation conditions. The irradiation conditions can be appropriately set according to the type and the mixing amount of the constituent components of the composition for forming an optical film.

As mentioned above, the optical film of the present embodiment can be formed on the substrate. Here, the liquid dispersion of fluoride particles of the present embodiment has low viscosity and also has satisfactory dispersibility of fluoride particles. Therefore, the optical film formed by using the composition for forming an optical film, which contains the liquid dispersion, has low refractive index, and optical properties such as light transmittance, haze and light reflectance are uniform in the plane. Therefore, the optical film of the present embodiment is suitable for an antireflection film or the like.

EXAMPLES

Suitable Examples of the present invention will be described in detail below. However, materials or mixing amounts mentioned in these Examples do not purport to limit the scope of the present invention only to these unless there is a definitive description.

(Measurement Method of Average Particle Size)

Using a particle size distribution measuring instrument (Microtrac, Nanotrac UPA, UPA-UZ152, manufactured by MicrotracBEL Corp.), the average particle size of fluoride particles in the liquid dispersion was measured. It is noted that the average particle size (d50) is a particle size defined by the fact that particles having an average dispersion particle size or less accounts for 50% by volume of the entire sample particles.

Measurement principle: dynamic light scattering frequency analysis (FFT-heterodyne method).

Light source: 3 mW, two semiconductor lasers of 780 nm

Set temperature range: 10° C. to 80° C.

Particle size distribution measuring range: 0.8 nm to 6.5406 μm

Measurement target: colloidal particles

Unless otherwise specified, each average particle size in Examples and Comparative Examples means a volume-equivalent average particle size measured by the above dynamic light scattering method.

(Moisture Measurement Method)

The moisture concentration in the liquid dispersion of fluoride particles was measured by the Karl Fischer method. A TQV-2200S (trade name) manufactured by Hiranuma Sangyo Co., Ltd. was used as the moisture measuring device. The measurement method was the volumetric titration method based on JIS K 0068 (2001).

(Viscosity Measuring Method)

The viscosity of the liquid dispersion of fluoride particles was measured using a B-type viscometer. As the B-type viscometer, a DV-I PRIME (trade name) manufactured by Brookfield, USA was used. The measurement was performed based on JIS K 5600-2-2 (2004).

(Method for Measuring Solvent Affinity)

An index (Rsp value) of the solvent affinity of the liquid dispersion of fluoride particles was calculated by pulse NMR. The Rsp value was measured using Spinsolve 60 ULTRA Phosphorus manufactured by Magritek as a measuring apparatus, by NMR (measurement nucleus: 1H) and the CPMG (Carr-Purcell-Meiboom-Gill sequence) method. The Rsp value was calculated by the following Formula (1).

$$Rsp=(Rav-Rb)/(Rb) \quad (1)$$

wherein Rsp is an index indicating solvent affinity, Rav is a reciprocal of a relaxation time of a liquid dispersion of fluoride particles, and Rb is a reciprocal of a relaxation time of a blank solvent excluding fluoride particles in the liquid dispersion of fluoride particles.

Example 1

In a fluororesin container, 1,600 g of propylene glycol monomethyl ether (PGME, reagent) and 80 g of $Na_3AlF_6$ particles (manufactured by Stella Chemifa Corporation) were mixed to prepare a slurry containing aggregated $Na_3AlF_6$ particles. This slurry was charged into a bead mill (manufactured by Nippon Coke & Engineering Co., Ltd.) and subjected to dispersion treatment. After the slurry was charged, a portion where the slurry was exposed to the outside air was set to a nitrogen atmosphere. As the beads, zirconia beads (manufactured by Nikkato Corporation) were used. During the dispersion treatment, the liquid dispersion was sampled at regular time intervals and the particle size distribution of the sample was measured. The dispersion treatment was performed until the average particle size (volume-based average particle size, d 50) of $Na_3AlF_6$ particles decreased and the decrease was stopped, thereby obtaining 1,000 g of a mixed solution containing $Na_3AlF_6$ particles. Thereafter, 1 g of PLYSURF A212C (trade name, manufactured by DKS Co. Ltd.) as a dispersant was added to the mixed solution, and ultrasonic treatment was performed for 1 minute. As a result, a liquid dispersion of $Na_3AlF_6$ particles in which the content of $Na_3AlF_6$ particles was 5 mass % with respect to the total mass of the liquid dispersion, and the content of PLYSURF A212C as a dispersant was 2 mass % with respect to 100 mass % of $Na_3AlF_6$ particles was obtained. The physical property values of the obtained liquid dispersion are shown in Table 1.

Example 2

In the present example, the addition amount of PLYSURF A212C as a dispersant was changed to 2 g (4 mass % with respect to 100 mass % of $Na_3AlF_6$ particles). A liquid dispersion according to the present example was prepared in the same manner as in Example 1 except for the above-described difference. The physical property values of the obtained liquid dispersion are shown in Table 1.

Example 3

In the present example, NEOPELEX GS (trade name, manufactured by Kao Corporation) was used as a dispersant instead of PLYSURF A212C. A liquid dispersion according to the present example was prepared in the same manner as in Example 1 except for the above-described difference. The physical property values of the obtained liquid dispersion are shown in Table 1.

Example 4

In the present example, 7H-dodecafluoroheptanoic acid was used as a dispersant instead of PLYSURF A212C. In addition, the addition amount of 7H-dodecafluoroheptanoic acid was also changed to 0.1 g (0.2 mass % with respect to 100 mass % of $Na_3AlF_6$ particles) with respect to 1,000 g of the liquid dispersion. A liquid dispersion according to the present example was prepared in the same manner as in Example 1 except for the above-described differences. The physical property values of the obtained liquid dispersion are shown in Table 1.

Example 5

In the present example, heptanoic acid was used as a dispersant instead of PLYSURF A212C. In addition, the addition amount of heptanoic acid was also changed to 0.1 g (0.2 mass % with respect to 100 mass % of $Na_3AlF_6$ particles) with respect to 1,000 g of the liquid dispersion. A liquid dispersion according to the present example was prepared in the same manner as in Example 1 except for the above-described differences. The physical property values of the obtained liquid dispersion are shown in Table 1.

Example 6

In the present example, the preparation conditions of the slurry were changed so that the content of $Na_3AlF_6$ particles was 1 mass % with respect to the total mass of the liquid dispersion. A liquid dispersion according to the present example was prepared in the same manner as in Example 1 except for the above-described difference. The physical property values of the obtained liquid dispersion are shown in Table 1.

Example 7

In the present example, the preparation conditions of the slurry were changed so that the content of $Na_3AlF_6$ particles was 30 mass % with respect to the total mass of the liquid dispersion. A liquid dispersion according to the present example was prepared in the same manner as in Example 1 except for the above-described difference. The physical property values of the obtained liquid dispersion are shown in Table 1.

Example 8

In the present example, $Na_5Al_3F_{14}$ was used instead of $Na_3AlF_6$ particles. A liquid dispersion according to the present example was prepared in the same manner as in Example 1 except for the above-described difference. The physical property values of the obtained liquid dispersion are shown in Table 1.

Example 9

In the present example, $LiCaAlF_6$ was used instead of $Na_3AlF_6$ particles. A liquid dispersion according to the present example was prepared in the same manner as in Example 1 except for the above-described difference. The physical property values of the obtained liquid dispersion are shown in Table 1.

Example 10

In the present example, 2-propanol (IPA, reagent) was used as a dispersion solvent instead of PGME. A liquid dispersion according to the present example was prepared in the same manner as in Example 1 except for the above-described difference. The physical property values of the obtained liquid dispersion are shown in Table 1.

Example 11

In the present example, methyl ethyl ketone (MEK, reagent) was used as a dispersion solvent instead of PGME. In addition, 7H-dodecafluoroheptanoic acid was used as a dispersant instead of PLYSURF A212C. A liquid dispersion according to the present example was prepared in the same manner as in Example 1 except for the above-described differences. The physical property values of the obtained liquid dispersion are shown in Table 1.

Comparative Example 1

In the present comparative example, Noigen (registered trademark, manufactured by DKS Co. Ltd.) as a nonionic surfactant was used as a dispersant. A liquid dispersion according to the present comparative example was prepared in the same manner as in Example 1 except for the above-described difference. The physical property values of the obtained liquid dispersion are shown in Table 1.

Comparative Example 2

In the present comparative example, Ftergent (registered trademark) 310 (manufactured by NEOS Co. Ltd.) as a nonionic surfactant was used as a dispersant. A liquid dispersion according to the present comparative example was prepared in the same manner as in Example 1 except for the above-described difference. The physical property values of the obtained liquid dispersion are shown in Table 1.

Comparative Example 3

In the present comparative example, a liquid dispersion according to the present comparative example was prepared in the same manner as in Example 1 except that no dispersant was used. The physical property values of the obtained liquid dispersion are shown in Table 1.

Comparative Example 4

In the present comparative example, magnesium fluoride particles (manufactured by Stella Chemifa Corporation) were used as fluoride particles instead of $Na_3AlF_6$ particles. In addition, no dispersant was used. A liquid dispersion according to the present comparative example was prepared in the same manner as in Example 1 except for the above-described differences. The physical property values of the obtained liquid dispersion are shown in Table 1.

TABLE 1

| | Fluoride particles | Organic solvent | Dispersant | Content of fluoride particles (mass %) | Content of dispersant (mass %) | Moisture concentration (mass %) | Average dispersed particle size (nm) | Rsp value | Viscosity (mPa · s) |
|---|---|---|---|---|---|---|---|---|---|
| Example 1 | $Na_3AlF_6$ | PGME | PLYSURF A212C | 5 | 2 | 0.5 | 12 | 11.9 | 3.4 |
| Example 2 | $Na_3AlF_6$ | PGME | PLYSURF A212C | 5 | 4 | 0.4 | 9.4 | 12.5 | 3.2 |
| Example 3 | $Na_3AlF_6$ | PGME | NEOPELEX GS | 5 | 2 | 0.8 | 9.3 | 8.5 | 3.6 |
| Example 4 | $Na_3AlF_6$ | PGME | 7H-Dodecafluoroheptanoic acid | 5 | 0.2 | 0.5 | 52 | 5.4 | 4.8 |
| Example 5 | $Na_3AlF_6$ | PGME | Heptanoic acid | 5 | 0.2 | 0.5 | 15 | 5.8 | 4.0 |
| Example 6 | $Na_3AlF_6$ | PGME | PLYSURF A212C | 1 | 2 | 0.3 | 10 | 11.5 | 2.3 |
| Example 7 | $Na_3AlF_6$ | PGME | PLYSURF A212C | 30 | 2 | 0.8 | 14 | 12.3 | 15.5 |
| Example 8 | $Na_5Al_3F_{14}$ | PGME | PLYSURF A212C | 5 | 2 | 0.5 | 20 | 10.8 | 3.8 |
| Example 9 | $LiCaAlF_6$ | PGME | PLYSURF A212C | 5 | 2 | 0.4 | 25 | 11.2 | 3.5 |
| Example 10 | $Na_3AlF_6$ | IPA | PLYSURF A212C | 5 | 2 | 0.5 | 21 | 14.5 | 4.0 |
| Example 11 | $Na_3AlF_6$ | MEK | 7H-Dodecafluoroheptanoic acid | 5 | 2 | 0.4 | 81 | 6.3 | 2.2 |
| Comparative Example 1 | $Na_3AlF_6$ | PGME | Noigen XL-40 | 5 | 2 | 0.6 | 120 | 3.2 | 4.6 |
| Comparative Example 2 | $Na_3AlF_6$ | PGME | Ftergent 310 | 5 | 2 | 0.6 | 325 | 2.8 | 4.0 |
| Comparative Example 3 | $Na_3AlF_6$ | PGME | None | 5 | — | 0.4 | 360 | 3.8 | 5.0 |
| Comparative Example 4 | $MgF_2$ | PGME | None | 10 | — | 0.8 | 13 | 22.1 | 10.8 |

Example 12

First, 27.5 g of the liquid dispersion prepared in Example 1 and 1.2 g of a commercially available acrylate coating material (acrylic resin) were mixed. Further, 0.6 g of 1-hydroxycyclohexyl phenyl ketone (photopolymerization initiator) was dissolved in the mixed solution to obtain a composition for forming an optical film. Next, 10 g of the composition for forming an optical film was diluted with 10.9 g of propylene glycol monomethyl ether to prepare a low refractive index coating material.

One surface of a PET film (Lumirror (registered trademark) U34 manufactured by Toray Industries, Inc., thickness: 100 μm) was coated with 300 μl of the diluted low refractive index coating material by spin coating. The coating film was dried at 130° C., and then irradiated with ultraviolet rays at 400 $mJ/cm^2$ to be photocured, and thus an antireflection film (low refractive index layer, optical film) was layered on the PET film.

Example 13

In the present example, the liquid dispersion prepared in Example 2 was used instead of the liquid dispersion prepared in Example 1. An antireflection film according to the present example was layered in the same manner as in Example 12 except for the above-described difference.

Example 14

In the present example, the liquid dispersion prepared in Example 3 was used instead of the liquid dispersion prepared in Example 1. An antireflection film according to the present example was layered in the same manner as in Example 12 except for the above-described difference.

Example 15

In the present example, the liquid dispersion prepared in Example 4 was used instead of the liquid dispersion prepared in Example 1. An antireflection film according to the present example was layered in the same manner as in Example 12 except for the above-described difference.

Example 16

In the present example, the liquid dispersion prepared in Example 5 was used instead of the liquid dispersion prepared in Example 1. An antireflection film according to the present example was layered in the same manner as in Example 12 except for the above-described difference.

Example 17

In the present example, the liquid dispersion prepared in Example 6 was used instead of the liquid dispersion prepared in Example 1. An antireflection film according to the present example was layered in the same manner as in Example 12 except for the above-described difference.

Example 18

In the present example, the liquid dispersion prepared in Example 7 was used instead of the liquid dispersion prepared in Example 1. An antireflection film according to the present example was layered in the same manner as in Example 12 except for the above-described difference.

Example 19

In the present example, the liquid dispersion prepared in Example 8 was used instead of the liquid dispersion prepared in Example 1. An antireflection film according to the present example was layered in the same manner as in Example 12 except for the above-described difference.

Example 20

In the present example, the liquid dispersion prepared in Example 9 was used instead of the liquid dispersion prepared in Example 1. An antireflection film according to the present example was layered in the same manner as in Example 12 except for the above-described difference.

Example 21

In the present example, the liquid dispersion prepared in Example 10 was used instead of the liquid dispersion prepared in Example 1. An antireflection film according to the present example was layered in the same manner as in Example 12 except for the above-described difference.

Example 22

In the present example, the liquid dispersion prepared in Example 11 was used instead of the liquid dispersion prepared in Example 1. An antireflection film according to the present example was layered in the same manner as in Example 12 except for the above-described difference.

Comparative Example 5

In the present example, the liquid dispersion prepared in Comparative Example 1 was used instead of the liquid dispersion prepared in Example 1. An antireflection film according to the present comparative example was layered in the same manner as in Example 12 except for the above-described difference.

Comparative Example 6

In the present example, the liquid dispersion prepared in Comparative Example 2 was used instead of the liquid dispersion prepared in Example 1. An antireflection film according to the present comparative example was layered in the same manner as in Example 12 except for the above-described difference.

Comparative Example 7

In the present example, the liquid dispersion prepared in Comparative Example 3 was used instead of the liquid dispersion prepared in Example 1. An antireflection film according to the present comparative example was layered in the same manner as in Example 12 except for the above-described difference.

Comparative Example 8

In the present example, the liquid dispersion prepared in Comparative Example 4 was used instead of the liquid dispersion prepared in Example 1. An antireflection film according to the present comparative example was layered in the same manner as in Example 12 except for the above-described difference.

(Haze Measurement and Minimum Light Reflectance Measurement)

Using an ultraviolet-visible near-infrared spectrophotometer (trade name: V670, manufactured by JASCO Corporation), the haze value of the antireflection film (low reflectance layer), and the minimum light reflectance of the antireflection film (low refractive index layer) were measured in accordance with JIS K 7136.

The physical properties of the antireflection films according to Examples 12 to 22 and Comparative Examples 5 to 8 are shown in Table 2. In the antireflection film of Comparative Example 8, the light transmittance of the antireflection film was high, and the haze value was equivalent to that of a single PET film. Therefore, each numerical value in Examples 12 to 22 and Comparative Examples 5 to 7 in Table 2 indicates a relative value with respect to a reference value with the optical characteristics of the antireflection film of Comparative Example 8 as 100 (reference value). Regarding the haze and the minimum light reflectance in Table 2, a smaller numerical value indicates better optical characteristics of the antireflection film.

TABLE 2

| | Liquid dispersion | Concentration (vol %) of fluoride particles contained in antireflection film | Haze | Minimum light reflectance |
|---|---|---|---|---|
| Example 12 | Liquid dispersion of Example 1 | 50 | 100 | 75 |
| Example 13 | Liquid dispersion of Example 2 | 50 | 100 | 87 |
| Example 14 | Liquid dispersion of Example 3 | 50 | 100 | 91 |
| Example 15 | Liquid dispersion of Example 4 | 50 | 100 | 66 |
| Example 16 | Liquid dispersion of Example 5 | 50 | 100 | 68 |
| Example 17 | Liquid dispersion of Example 6 | 50 | 100 | 75 |
| Example 18 | Liquid dispersion of Example of 7 | 50 | 100 | 72 |
| Example 19 | Liquid dispersion of Example 8 | 50 | 100 | 80 |
| Example 20 | Liquid dispersion of Example 9 | 50 | 100 | 92 |
| Example 21 | Liquid dispersion of Example 10 | 50 | 100 | 72 |

TABLE 2-continued

| | Liquid dispersion | Concentration (vol %) of fluoride particles contained in antireflection film | Haze | Minimum light reflectance |
|---|---|---|---|---|
| Example 22 | Liquid dispersion of Example 11 | 50 | 100 | 78 |
| Comparative Example 5 | Liquid dispersion of Comparative Example 1 | 50 | 158 | 80 |
| Comparative Example 6 | Liquid dispersion of Comparative Example 2 | 50 | 175 | 72 |
| Comparative Example 7 | Liquid dispersion of Comparative Example 3 | 50 | 160 | 59 |
| Comparative Example 8 | Liquid dispersion of Comparative Example 4 | 50 | 100 | 100 |

The invention claimed is:

1. A liquid dispersion of fluoride particles, the liquid dispersion comprising:

fluoride particles;

an anionic surfactant as a dispersant for the fluoride particles; and an organic solvent, wherein the fluoride particles contain at least aluminum, an alkali metal, and an alkaline earth metal as an optional element in a composition of the fluoride particles, the fluoride particles are dispersed in the organic solvent, and a moisture concentration in the liquid dispersion of fluoride particles is 1.5 mass % or less with respect to 100 mass % of the liquid dispersion of fluoride particles.

2. The liquid dispersion of fluoride particles according to claim 1, wherein a counter ion of a hydrophilic group in the anionic surfactant is a proton or an onium ion.

3. The liquid dispersion of fluoride particles according to claim 1, wherein the anionic surfactant is at least one of an anionic hydrocarbon surfactant and an anionic fluorocarbon surfactant represented by a following Chemical Formula (1):

$$R—X—M \quad (1)$$

wherein R represents an alkyl group having 2 to 18 carbon atoms, an aryl group having 2 to 18 carbon atoms, a polyoxyalkylene alkyl ether group having 2 to 18 carbon atoms, an alkyl group having 2 to 18 carbon atoms in which at least one hydrogen atom is substituted with a fluorine atom, an aryl group having 2 to 18 carbon atoms in which at least one hydrogen atom is substituted with a fluorine atom, or a polyoxyalkylene alkyl ether group having 2 to 18 carbon atoms in which at least one hydrogen atom is substituted with a fluorine atom, X represents $—COO^-$, $—PO_4^-$, $—SO_3^-$, or $—SO_4^-$, and M represents a proton or an onium ion.

4. The liquid dispersion of fluoride particles according to claim 1, wherein a content of the anionic surfactant is in a range of 0.2 mass % to 8 mass % with respect to 100 mass % of the fluoride particles.

5. The liquid dispersion of fluoride particles according to claim 1, wherein the fluoride particles are particles of at least one fluoride selected from a group consisting of $Na_3AlF_6$, $Na_5Al_3F_{14}$, $Na_3Li_3Al_2F_{12}$, $Na_2MgAlF_7$, $K_2NaAlF_6$, $LiCaAlF_6$, and $LiSrAlF_6$.

6. The liquid dispersion of fluoride particles according to claim 1, wherein the organic solvent is at least one of an alcohol solvent, a ketone solvent, and an ether solvent.

7. The liquid dispersion of fluoride particles according to claim 1, wherein an average dispersed particle size of the fluoride particles is in a range of 1 nm to 100 nm.

8. The liquid dispersion of fluoride particles according to claim 1, wherein a content of the fluoride particles is in a range of 1 mass % to 30 mass % with respect to 100 mass % of the liquid dispersion of fluoride particles.

9. The liquid dispersion of fluoride particles according to claim 1, wherein an Rsp value of the liquid dispersion of fluoride particles as measured by pulse NMR is 5 or more.

10. A composition for forming an optical film, comprising the liquid dispersion of fluoride particles according to claim 1.

11. An optical film comprising a cured film of the composition for forming an optical film according to claim 10.

12. A liquid dispersion of fluoride particles, the liquid dispersion comprising:

fluoride particles;

an anionic surfactant as a dispersant for the fluoride particles; and an organic solvent, wherein the fluoride particles contain at least aluminum, an alkali metal, and an alkaline earth metal as an optional element in a composition of the fluoride particles, the fluoride particles are dispersed in the organic solvent, and an Rsp value of the liquid dispersion of fluoride particles as measured by pulse NMR is 5 or more.

13. A composition for forming an optical film, comprising the liquid dispersion of fluoride particles according to claim 12.

14. An optical film comprising a cured film of the composition for forming an optical film according to claim 13.

* * * * *